United States Patent [19]

Siegrist et al.

[11] Patent Number: 4,472,926
[45] Date of Patent: Sep. 25, 1984

[54] LAWN MOWER HOUSING STRUCTURE

[75] Inventors: Rudolph Siegrist, Valley City; Juergen Kaesgen, Brunswick, both of Ohio

[73] Assignee: MTD Products Inc., Cleveland, Ohio

[21] Appl. No.: 543,608

[22] Filed: Oct. 20, 1983

[51] Int. Cl.³ .............................................. A01D 35/264
[52] U.S. Cl. ...................................... 56/13.6; 56/13.8; 56/320.2
[58] Field of Search ................ 56/13.6, 320.2, 13.7, 56/13.8, DIG. 22, 202, 6

[56] References Cited

U.S. PATENT DOCUMENTS 2,898,723  8/1959  Goodall ................................ 56/13.6
3,413,783 12/1968  Gordon ................................ 56/320.2
3,461,654  8/1969  Plamper ............................ 56/DIG. 22
3,568,421  3/1971  Smith et al. ......................... 56/320.2

Primary Examiner—J. N. Eskovitz
Attorney, Agent, or Firm—Woodling, Krost, Rust and Hochberg

[57] ABSTRACT

A mower housing having a plurality of chambers (11 and 12) so proportioned in capacity, and cutting blades (13 and 14) therein, so proportioned in capacity that one chamber and blade can handle and advance the grass clippings blown with air from the other chamber and blade as well as the grass clippings blown with air produced in that one chamber. The housing having means (25) for controlling and directing the flow of grass cuttings discharged from the housing and means (26) for collecting in increments in the form of tufts or bunches and the ejecting of such increments by the mower blade.

11 Claims, 3 Drawing Figures

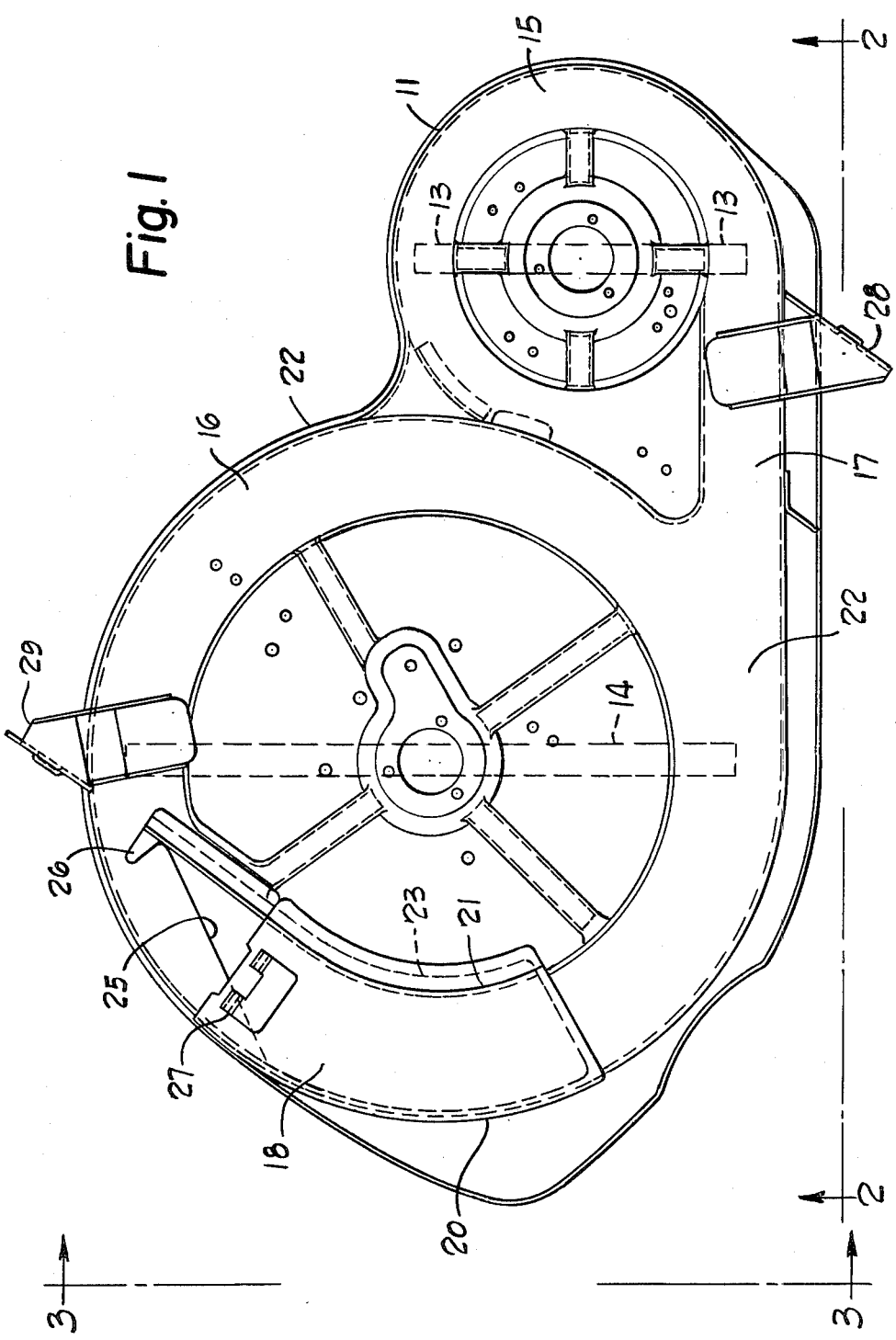

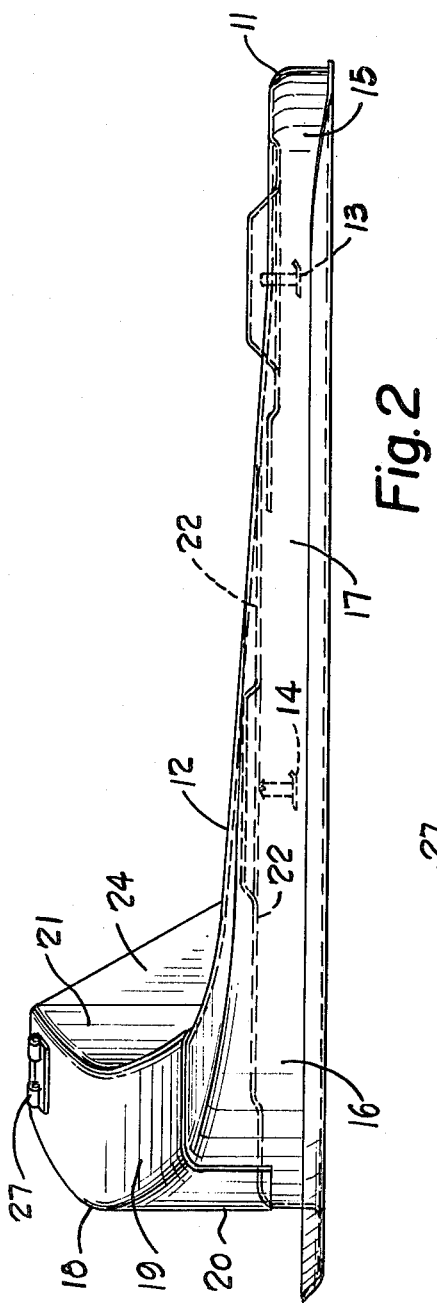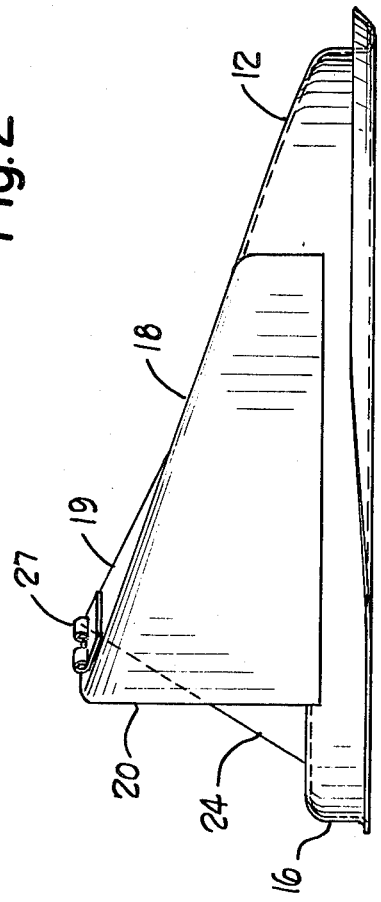

LAWN MOWER HOUSING STRUCTURE

FIELD TO WHICH INVENTION RELATES

Our invention relates to the structure of lawn mower housings and to discharge ducts of the same, and particularly for the arrangement of the chambers of the housing and for the proper ejection of grass cuttings to minimize clogging or obstruction of the flow of grass cuttings from the housing.

The invention relates to housing chambers or portions of a housing laterally spaced of the path of the mower and disposed beside each other.

The invention also relates to arrangements for control and direction of the grass cuttings from the discharge duct of a mower housing to minimize clogging.

BACKGROUND OF THE INVENTION

The related background art known to Applicants, but which does not teach, disclose or suggest the present invention, includes the many prior patents showing side-by-side housing chambers disposed laterally of the mower path, and also the many prior patents showing a discharge duct extending upwardly and rearwardly of a mower housing for discharging air and grass cuttings blown therethrough by a rotating cutting blade in the housing.

STATEMENT OF THE INVENTION

It is an object of our invention to so proportion the capacities of side-by-side laterally disposed lawn mower housing chambers that the discharge of grass clippings from a first chamber is advanced into a second chamber dimensioned to accommodate both the clippings from the first chamber and the clippings produced within the second chamber.

Another object of the invention is to obtain greater efficiency in handling grass cuttings produced in a plurality of housing chambers.

Another object is the provision of an improved arrangement and structure for a housing for a lawn mower having a plurality of rotating cutting blades.

Another object is the provision for minimizing the clogging of a lawn mower housing by the grass clippings produced by the mower.

Another object is the provision of means for ejecting of grass clippings from the discharge duct of a mower housing in a form avoiding the clogging of the duct and housing with an inner coating of grass clippings.

Another object is the efficient control of the flow of air and grass clippings produced by a rotating cutting blade within a mower housing to obtain a discharge of the grass clippings with a minimum of obstruction or retardation.

Other objects and advantages may be observed from the following description taken in conjunction with the several drawings.

FIGURES OF THE DRAWINGS

FIG. 1 is a plan view of a two-chambered mower housing embodying a preferred form of housing embodying our invention;

FIG. 2 is a generally front view of the housing shown in FIG. 1 looking in the direction of the arrows 2—2 of FIG. 1; and FIG. 3 is a side view of the housing shown in FIG. 1 looking in the direction of the arrows 3—3 of FIG. 1.

DESCRIPTION OF THE INVENTION HEREIN DISCLOSED

Our housing for a rotary type mower preferably has two side-by-side portions 11 and 12 arranged laterally of the path of travel of the mower. The mower travels generally in a direction toward the left and toward the bottom of the paper showing the view of FIG. 1. The forward portion of the housing in this forward portion is that shown in FIG. 2.

The portion or section 11 of the dual housing has a chamber 15 within it and faces downwardly toward a ground surface in the usual manner. The portion or section 12 of the dual housing has a chamber 16 within it and faces downwardly toward a ground surface in the usual manner. The diameter of the cylindrical chamber 16 is substantially twice the diameter of the cylindrical chamber 15. The volumetric capacity of the chamber 16 is substantially greater than the volumetric capacity of the chamber 15. A passageway 17 within the dual housing provides communication between the two chambers whereby air and grass clippings produced in the smaller chamber 15 may freely flow from chamber 15 into larger chamber 16.

A rotatable cutting blade 13 mounted on an engine driven rotor in the smaller chamber upon being rotated in a horizontal plane cuts growing grass extending into the chamber 15 and blows air and grass clippings out of the chamber 15 through the passageway 17 into the chamber 16. The cutting blade 13 has a forward cutting edge portion and a trailing sail portion as in the usual well known cutting blade.

A rotatable cutting blade 14 mounted on an engine driven rotor in the larger chamber upon being rotated in a horizontal plane cuts growing grass extending into the chamber and blows air and grass clippings out of the chamber 16 and discharged therefrom through the opening 23 in the housing. The blade 14 like the blade 13 has a forward cutting edge portion for cutting and a trailing sail portion for blowing air and grass cuttings.

The rotors in the two chambers are preferably driven by a single engine through a belt arrangement for rotating the blades at substantially the same tip speed.

The axes of rotation of the two blades 13 and 14 are somewhat off-set from a lateral line normal to the line of travel of the mower to assure cutting of all the grass between said axes without the blades interfering with each other as they rotate.

The effective length of the blade 14 from tip to tip is substantially twice the effective length of the blade 13 from tip to tip. The cutting and the blowing capacity of the blade 14 is substantially greater than the cutting and blowing capacity of the blade 13.

The capacities of the two chambers 15 and 16 and the cutting and blowing capabilities of the two blades 13 and 14 are so proportioned that the larger chamber 16 and its blade 14 can readily and fully handle and advance both the blown air with grass clippings produced in chamber 15 by blade 13 and the blown air with grass clippings produced in chamber 16 by blade 14 so that the sum of the blown air with grass clippings can be efficiently and fully handled and discharged together from the housing through the opening 23 in the housing.

An efficient mower cutting unit is thus produced with this combination in the proportions described with a minimum of structure and parts. The proportions in sizing of housing chambers and blades provide these unique and surprising results in efficiency and economy of structure.

Our invention also includes a novel and useful means for handling and controlling the discharge of grass clippings produced by the blades in the chambers of the housing. The housing has a generally horizontally disposed flat upper deck plate 22 and a skirt extending downwardly therefrom around its periphery in the usual manner. The chambers 15 and 16 are below this deck and surrounded by the skirt.

The arcuate shaped opening 23 is formed in the deck above the chamber 16 in a location for discharge through the opening 23 of blown air and grass clippings produced in chamber 16 plus the blown air and grass clippings received through passageway 17 from chamber 15.

The upper deck plate 22 of the housing around the arcuate boundary thereof is gradually inclined upwardly as the arcuate opening is approached. Mounted on the housing over the arcuate opening 23 is a hood 18 which is curved in a plan view and generally following the curvature of opening 23 so as to extend along with the opening 23.

The hood 18 has an upper inclined wall 19 and extending downwardly therefrom to meet the deck of the housing are two spaced sidewalls 20 and 21. The hood 18 meets the flow of air and grass clippings blown upwardly and rearwardly through the opening 23 upwardly and rearwardly from the housing, that is rearwardly in respect to forward movement of the mower carrying the housing.

A catch or bracket 27 mounted on the hood 18 adjacent the rearward edge thereof is provided for readily fixing a grass catcher (not shown) to the hood for catching grass clippings discharged from the mower housing.

Brackets 28 and 29 are mounted on opposite sides of the housing for securement to the brackets of wheels (not shown) for rolling support of the housing.

The opening 23 in the deck plate 22 terminates as shown at an inclined acute angle to the axis of the opening and to the path of blown grass cuttings from the opening. At this termination of the opening, the deck extends radially inward from the peripheral boundary of the housing to form the inclined guiding edge 25 at the terminus of opening 23, this guiding edge or deck portion 25 extends from just within the hood 18 near the skirt of the housing gradually radially inward to a location spaced from the rearward discharge end of hood 18.

At this spaced location at the end of inclined guiding portion 25 is a notch or dwell 26 extending radially outward as shown. Grass cuttings driven rearwardly with blown air through the opening 23 and hood 18 encounters the inclined guiding surface and under the force of the blown air slides rearwardly therealong to the notch or dwell 26. When the grass cuttings sliding along the guiding edge 25 collect in the notch 26 they form tufts or bunches of grass clippings in the notch 25.

A supplemental plate 24 is mounted on the housing in general alignment with inner wall 21 of the hood so as to provide a rearward extension of said inner wall 21. The supplemental plate 24 is somewhat triangular in shape in that it has a gradually decreasing height as it extends rearwardly to opposite the notch 26. This supplemental plate deflects blown grass clippings as they may tend to divert and scatter as they leave the opening 23 and hood 18, such deflection aiding in driving the scattering grass clippings back toward the inclined guiding portion 25.

The inclined guiding portion disposed as shown is buffeted by the air and grass clippings carried thereby and so tend to collect and pass along to the notch 26 the grass clippings.

The cutting blade 14 as it rotates in a horizontal plane just below the guiding portion 25 and notch 26 aids in moving grass clippings on the guiding portion therealong and into the notch 26. The grass clippings as collected in tufts or bunches are knocked or blown from the notch 26 by the recurrently passing blade 14 in its rotation.

This arrangement and the action described aids in minimizing clogging of the housing and discharge duct with an excess of internal coating of grass clippings adhering to the housing and discharge passageway.

This provides for efficiency in the operation and maintenance of the mower with a minimum of care.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a rotary type lawn mower having a housing for accommodating a cutting blade rotatable therein in a first circumferential direction and in a horizontal plane to cut grass and blow air and grass cuttings in said first circumferential direction, the said housing having a deck plate disposed in a generally horizontal plane and a skirt portion depending from said deck plate, said deck plate having an opening for discharge of said blown air and grass cuttings therethrough, and a hood carried by said deck over said opening, said hood having an upper wall inclined upwardly from said deck plate and spaced parallel sidewalls extending downwardly from said upper wall to said deck plate, said hood terminating to form a discharge duct for the blown air and grass cuttings advanced by the said cutting blade in said first circumferential direction, said hood directing said blown air and grass cuttings in a path away from said housing, the improvement of a guiding portion of the housing disposed in generally the horizontal plane of said deck plate, said guiding portion being disposed athwart said path of the blown air and grass cuttings to encounter the same, said guiding portion having an edge disposed at an acute angle to the axis of said path and extending from adjacent the said discharge duct and the skirt of said housing inwardly of the housing spaced radially inward and at a circumferential distance from said discharge duct, said guiding portion at said location having a notch formed therein, said notch extending from said edge of the guiding portion radially outward toward said skirt, the grass cuttings of the air and grass cuttings blown out of the discharge duct encountering said edge and being guided thereby to said location where it lodges in tufts within said notch and which tufts are successively knocked outwardly thereof by the said cutting blade rotating below in its horizontal plane below said deck.

2. The improvement claimed in claim 1 and including a supplemental plate carried by the housing in a vertical plane in line with the radially innermost of the sidewalls of said hood, said supplemental plate deflecting grass cuttings blown against the same from said discharge duct toward said guiding portion.

3. The improvement claimed in claim 2 and in which said supplemental plate has a gradually diminishing height in extending from adjacent said upper wall of the hood to adjacent said notch.

4. In a mower housing having a cutting blade rotatable in a horizontal plane within the housing, the housing having a deck and skirt depending from the deck, the housing deck having an opening therethrough through which air and grass cuttings are blown by the cutting blade, and an inclined hood over the said opening carried by the housing over the opening for directing the blown air and grass cuttings advancing through the said opening along a path in a leeward direction from the housing, the improvement of first means disposed athwart the path of blown air and grass clippings blown in said leeward direction to encounter the said grass clippings and to gradually guide the grass clippings in a path radially inward of the housing and to a location spaced from said inclined hood, and second means at said location to receive and trap tufts of said grass clippings guided to said location by the first means, said second means being located adjacent and above the said horizontal plane of the rotating blade whereby the rotating blade may strike and successively dislodge the tufts of grass cuttings from said second means.

5. The improvement claimed in claim 4 and in which said first means is a guiding portion of the housing disposed in the general horizontal plane of said deck, the guiding portion being disposed at an acute angle to the axis of the path of blown air and grass clippings as directed by the said hood, the guiding portion upon being encountered by the grass cuttings blown along said path guiding the grass cuttings to said location.

6. The improvement claimed in claim 5 and in which said second means is a notch formed in said guiding portion at said location to collect grass cuttings guided along said guiding portion and accommodate the collected grass cuttings as tufts in the notch, the guiding portion and notch being positioned relative to the horizontal plane and path of the cutting blade that the tufts of grass clippings as collected are struck and ejected by the blade as it rotates.

7. In a lawn mower housing having a discharge duct through which air and grass cuttings are blown by a rotatable cutting blade rotating in the housing within the housing and below the discharge duct, said housing having an upper deck plate having its major portion disposed generally in a horizontal plane and a skirt depending from the deck plate about its periphery, the improvement of guiding means carried by the housing and disposed on the leeward side of said discharge duct athwart the path of air and grass cuttings blown out of the discharge duct to encounter the grass clippings and to guide the grass clippings along an acute angle to said path to a location spaced from the discharge duct, said guiding means being disposed in a plane substantially parallel to said generally horizontal plane of the upper deck plate and extending at said acute angle from adjacent the discharge duct and the skirt of the housing gradually radially inwardly of the housing, and collecting means disposed adjacent the inner terminus of the guiding means radially inwardly spaced from the skirt for collecting grass clippings guided to said location into bunches in position to be struck from said collecting means by said cutting blade as it rotates in said housing for ejection of said bunches from the housing.

8. The improvement claimed in claim 7 and in which said guiding means is a flanged portion of the housing extending radially inward of the housing from the outer peripheral portion of the housing, the flanged portion having an edge disposed at an incline as it extends from adjacent the said outer peripheral portion of the housing radially inward to said location, said inclined edge portion being buffeted by grass clippings encountering the said edge and inducing grass clippings sliding along the said inclined edge to the said location by the force of said blown air.

9. The improvement claimed in claim 8 and in which said collecting means is a notch formed in said flange portion at said location, said notch extending from said inclined edge radially outward.

10. In a mower housing having a deck, a skirt depending from the deck, a rotatable cutting blade below the deck in the housing and a hood mounted on the housing above the deck through which grass clippings produced in the housing are discharged, the deck having an opening therein for the flow of grass clippings and air blown from within the housing up into said hood to be discharged therethrough, the improvement of said deck on the side of said opening having an edge portion on the leeward side of the hood extending from adjacent said skirt and hood gradually radially inwardly of the housing, said edge portion being disposed across the path of the flow of air and grass clippings blown from said opening and disposed at an acute angle to the axis of said path to encounter the blown grass clippings, the said deck edge portion being disposed to facilitate the grass clippings encountered by the edge to slide therealong radially inwardly into the path of the rotatable cutting blade toward one side of said path.

11. The improvement claimed in claim 10 and including a notch in said deck edge portion at said one side of the path in which grass clippings sliding along said deck edge portion may collect and be struck therefrom by the cutting blade rotating below the said deck.

* * * * *